US012785073B2

(12) United States Patent
Ye et al.

(10) Patent No.: US 12,785,073 B2
(45) Date of Patent: Nov. 3, 2026

(54) # GELLING CATHODE AND GELLED ELECTROLYTE AND METHOD OF FORMING THE SAME

(71) Applicant: Medtronic, Inc., Minneapolis, MN (US)

(72) Inventors: Hui Ye, Maple Grove, MN (US); Prabhakar A. Tamirisa, Brooklyn Park, MN (US); Kaimin Chen, Shoreview, MN (US); Gaurav Jain, Edina, MN (US)

(73) Assignee: Medtronic, Inc., Minneapolis, MN (US)

( * ) Notice: Subject to any disclaimer, the term of this patent is extended or adjusted under 35 U.S.C. 154(b) by 997 days.

(21) Appl. No.: 17/877,599

(22) Filed: Jul. 29, 2022

(65) Prior Publication Data

US 2023/0187608 A1 Jun. 15, 2023

Related U.S. Application Data

(60) Provisional application No. 63/288,918, filed on Dec. 13, 2021.

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/043* (2013.01); *H01M 4/0471* (2013.01);
(Continued)

(58) Field of Classification Search
CPC .... H01M 4/364; H01M 4/043; H01M 4/0471; H01M 4/136; H01M 4/405; H01M 4/54;
(Continued)

(56) References Cited

U.S. PATENT DOCUMENTS 4,830,940 A * 5/1989 Keister ............. H01M 10/0454 429/219
8,492,028 B2 7/2013 Itou et al.
(Continued)

FOREIGN PATENT DOCUMENTS

EP 2562865 12/2017

OTHER PUBLICATIONS

International Search Report and Written Opinion for PCT/IB2022/060941 dated Feb. 3, 2023 (10 pages).

*Primary Examiner* — Barbara L Gilliam
*Assistant Examiner* — Lawrence La Raia, III
(74) *Attorney, Agent, or Firm* — Mueting Raasch Group

(57) ABSTRACT

A method of forming an electrochemical cell includes mixing an active material, a conductive material, a binder, and a solvent to provide a cathode slurry. The method further includes heating the cathode slurry to provide a cathode mixture and grinding the cathode mixture to provide a ground cathode mixture. The method further includes heating the ground cathode mixture to provide a dried cathode powder and mixing a gelling powder with the dried cathode powder to provide gelling cathode powder. The method further includes s pressing the gelling cathode powder to form a cathode of the electrochemical cell.

10 Claims, 5 Drawing Sheets

(51) Int. Cl.

| | |
|---|---|
| ***H01M 4/04*** | (2006.01) |
| ***H01M 4/136*** | (2010.01) |
| ***H01M 4/1391*** | (2010.01) |
| ***H01M 4/40*** | (2006.01) |
| ***H01M 4/54*** | (2006.01) |
| ***H01M 4/58*** | (2010.01) |
| ***H01M 4/583*** | (2010.01) |
| ***H01M 4/62*** | (2006.01) |
| ***H01M 10/0525*** | (2010.01) |
| ***H01M 10/0567*** | (2010.01) |
| ***H01M 10/0568*** | (2010.01) |

(52) U.S. Cl.

CPC ......... *H01M 4/136* (2013.01); *H01M 4/1391* (2013.01); *H01M 4/405* (2013.01); *H01M 4/54* (2013.01); *H01M 4/582* (2013.01); *H01M 4/5835* (2013.01); *H01M 4/622* (2013.01); *H01M 4/623* (2013.01); *H01M 4/625* (2013.01); *H01M 10/0525* (2013.01); *H01M 10/0567* (2013.01); *H01M 10/0568* (2013.01); *H01M 2004/028* (2013.01); *Y02E 60/10* (2013.01)

(58) Field of Classification Search

CPC .... H01M 4/582; H01M 4/5835; H01M 4/623; H01M 4/625; H01M 10/0525; H01M 10/0567; H01M 2004/028; H01M 4/1391; H01M 4/622; Y02E 60/10

See application file for complete search history.

(56) References Cited

U.S. PATENT DOCUMENTS

| | | | | |
|---|---|---|---|---|
| 9,698,424 | B2 | 7/2017 | Rolff | |
| 11,127,938 | B2 | 9/2021 | Jiang | |
| 2015/0017529 | A1* | 1/2015 | Koo ...................... | H01M 4/485 429/215 |
| 2018/0269525 | A1 | 9/2018 | Hur | |
| 2020/0235420 | A1* | 7/2020 | Yushin .............. | H01M 10/0565 |
| 2023/0387394 | A1* | 11/2023 | Yamazaki ........... | H01M 4/5825 |

* cited by examiner

GELLING CATHODE AND GELLED ELECTROLYTE AND METHOD OF FORMING THE SAME

RELATED PATENT APPLICATION

This application claims the benefit of U.S. Provisional Patent Application Ser. No. 63/288,918, filed on Dec. 13, 2021, which is incorporated by reference herein in its entirety.

FIELD

The present disclosure relates to, among other things, batteries and electrochemical cells.

TECHNICAL BACKGROUND

Lithium batteries may include one or more electrochemical cells. Lithium batteries may include primary or rechargeable batteries. Each electrochemical cell includes an anode (e.g., a negative electrode), a cathode (e.g., a positive electrode), and an electrolyte provided within a case or housing. A separator made from a porous polymer or other suitable material may also be provided intermediate or between the anode and the cathode to prevent direct contact between the anode and the cathode. The anode includes a current collector having an active material, and the cathode includes a current collector having an active material.

Lithium batteries, or electrochemical cells, typically use liquid electrolyte to provide high conductivity and for its wettability on electrode surfaces. Low viscosity liquid electrolyte has relatively higher ionic conductivity that can provide a higher power output compared to other electrolyte compositions or higher viscosity liquid electrolytes. Additionally, low viscosity liquid electrolyte may be easier to dispense into the battery during battery assembly. However, interactions between low viscosity liquid electrolytes and typical lithium battery cathodes may provide some barriers to achieving a robust mechanical design of the battery while also providing high capacity and stable or smooth voltage curves during charge and discharge.

A sufficient quantity of electrolyte in close contact with active materials of the electrodes while the battery is charged or discharged, may provide a smooth voltage curve as the battery is charged or discharged. However, the electrodes of lithium batteries may expand or shrink while being charged or discharged. The cathode of lithium batteries may expand up to 50 percent to 100 percent during later stages of discharge. When the cathode expands, the porosity of the cathode increases. Voids may form within the cathode if electrolyte is unable to fill in the expanded pores of the cathode. Such voids may cause the voltage of the battery to fluctuate erratically.

Such effects can be mitigated by an increase in the amount of liquid electrolyte used to fill the battery and/or an increase in stack pressure between the cathode and the anode. Such increases may result, individually or in combination, in a smoother voltage curve. However, as the amount of liquid electrolyte increases the ratio of active material of the battery decreases, which may result in a lower battery capacity or energy density. Furthermore, an increase in stack pressure may require a thicker and more rigid battery case that may reduce energy density and increase an overall cost of the battery.

Additionally, low viscosity liquid electrolyte may move within the battery enclosure more readily than higher viscosity electrolytes. Such movement may lead to the movement of lithium ions within the battery and cause uncontrolled lithium deposition on inner surfaces of the battery case or housing, and electrode terminals. Furthermore, such deposition may damage insulation between the anode and cathode. As a result, an increase in self-discharge of the battery may occur.

BRIEF SUMMARY

As described herein, a smooth voltage curve of a lithium battery including liquid electrolyte may be achieved by including gelling powder with cathode materials during cathode formation. The addition of such gelling powder to the cathode may cause liquid electrolyte to gel after the battery enclosure is sealed.

Accordingly, when the cathode expands, the gelled electrolyte may adhere to the cathode material and prevent or reduce void formation as the porosity of the cathode increases. As a result, the gelled electrolyte adhered to the cathode material may prevent or reduce discontinuities in ionic conduction and the voltage of the battery may change smoothly and predictably as the battery is charged or discharged. Furthermore, less electrolyte may be used, thereby the free liquid electrolyte within the battery may be reduced. Thus, the gelling powder may reduce likelihood of defects that result in increased self-discharge that can occur due to uncontrolled lithium deposition.

In general, in one aspect, the present disclosure describes a method of forming an electrochemical cell. The method comprises mixing an active material, a conductive material, a binder, and a solvent to provide a cathode slurry. The method further comprises heating the cathode slurry to provide a cathode mixture and grinding the cathode mixture to provide a ground cathode mixture. The method further comprises heating the ground cathode mixture to provide a dried cathode powder and mixing a gelling powder with the dried cathode powder to provide gelling cathode powder. The method further comprises pressing the gelling cathode powder to form a cathode of the electrochemical cell.

In general, in another aspect, the present disclosure describes a system comprising an anode, a cathode, a housing, and one or more heat shunt sleeves. The housing comprises one or more surfaces and is configured to house the anode and the cathode. The one or more heat shunt sleeves are configured to receive the electrochemical cell such that the heat shunt sleeve covers at least a portion of the one or more surfaces. The one or more heat shunt sleeves further configured to distribute heat across the one or more surfaces of the housing.

In general, in another aspect, the present disclosure describes an electrochemical cell comprising an anode, a cathode, a separator, and a liquid electrolyte. The cathode comprises an active material, a conductive material, a binder, and a gelling powder. The separator is arranged between the anode and the cathode. The separator is configured to prevent direct contact between the anode and the cathode. The liquid electrolyte transports positively charged ions between the cathode and the anode.

Advantages and additional features of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative and are not intended to limit the scope of the claims in any manner.

BRIEF DESCRIPTION OF THE DRAWINGS

The following detailed description of specific embodiments of the present disclosure can be best understood when read in conjunction with the following drawings, in which.

DETAILED DESCRIPTION

Reference will now be made in greater detail to various embodiments of the subject matter of the present disclosure, some embodiments of which are illustrated in the accompanying drawings. Like numbers used in the figures refer to like components and steps. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

Reduction in erratic voltage changes and lithium plating can be achieved by adding an amount of gelling powder to cathode materials during cathode formation in lithium batteries or electrochemical cells that are assembled include a liquid electrolyte. Reduction of erratic voltage changes may result in a smooth voltage curve of a lithium battery. The gelling powder of the formed cathode may cause a portion of the liquid electrolyte to localize and or gel at surfaces of the cathode after the battery enclosure is sealed. Accordingly, when the cathode expands, the gelled electrolyte may adhere to the cathode material and prevent void formation as the porosity of the cathode increases. As a result, erratic voltage changes that may be caused by void formation may be eliminated or reduced. Thus, the voltage of the battery may change smoothly as the battery is charged or discharged.

Furthermore, less electrolyte may be used while still reducing void formation and, thereby, the energy density of the battery may be increased and free liquid electrolyte within the battery may be reduced. The free liquid electrolyte may further be reduced when at least a portion of the liquid electrolyte becomes gelled at surfaces of the cathode. A reduction in free liquid electrolyte may reduce lithium deposition that can result in damage to insulation between the anode and cathode and cause an increase in self-discharge. Thus, the inclusion of gelling powder in cathode materials may reduce the likelihood of defects that result in increased self-discharge that can occur due to lithium deposition.

Figure 1:
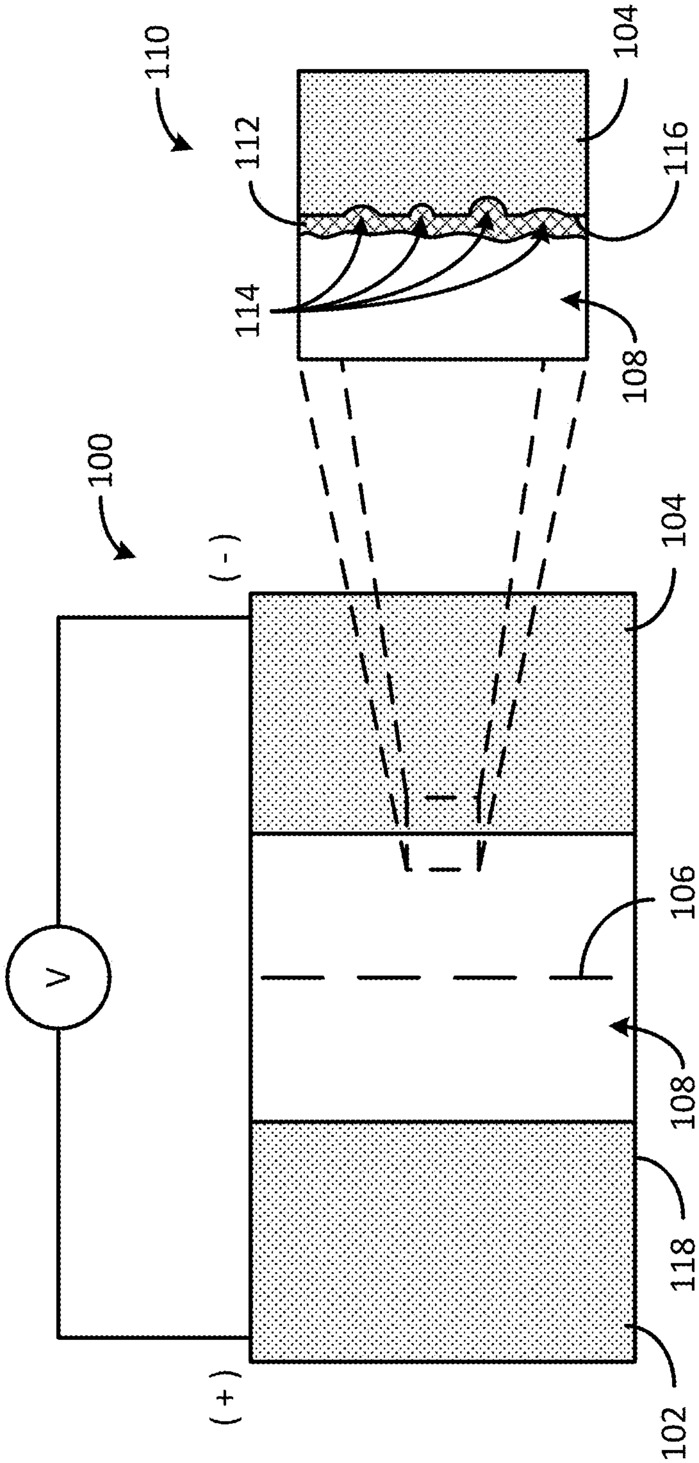
FIG. 1 is a schematic block diagram of an embodiment of an electrochemical cell.

FIG. 1 shows a schematic representation of an electrochemical cell 100. The electrochemical cell 100 includes an anode 102 (e.g., a negative electrode), a cathode 104 (e.g., a positive electrode), a liquid electrolyte 108, and a separator 106 (e.g., a polymeric microporous separator, indicated by the dashed line).

The electrochemical cell 100 may include any suitable chemistry. The chemistry of the electrochemical cell 100 may include, for example, lithium-metal, lithium-ion, lithium polymer, or other chemistries that may be subject to cathode expansion issues. In at least one embodiment, the electrochemical cell 100 includes a lithium-ion battery cell. The electrochemical cell 100 may be a primary cell or a secondary cell. In other words, the electrochemical cell 100 may or may not be rechargeable.

The anode 102 may include any suitable material or materials. Such materials may include, for example, one or more active materials, conductive materials, binders, or other suitable anode materials. Active material of the anode 102 may include, for example, one or more of carbon, graphite, silicon, lithium titanates, lithium, sodium, magnesium, or other negative active. Conductive materials of the anode 102 may include, for example, copper, gold, carbon, nickel, carbon black, graphene, carbon nanotubes, or other conductive materials. Binders of the anode 102 may include, for example, polyvinylidene fluoride (PVDF), poly(vinylidene fluoride-co-hexafluoropropylene) (PVDF-HFP), styrene-butadiene rubber (SBR), carboxymethyl cellulose (CMC), or other materials for binding anode materials together.

The cathode 104 may include any suitable material or materials. Such materials may include, for example, one or more active materials, conductive materials, binders, gelling powder or other suitable anode materials. Active material of the cathode 104 may include, for example, carbon fluoride, silver vanadates, lithium vanadates, manganese dioxide, vanadium dioxide, lithium cobalt oxide, lithium nickel-manganese-cobalt oxide, lithium nickel-cobalt-aluminum oxide, or other positive active materials. In one or more embodiment, the active material of the cathode includes carbon fluoride and silver vanadium oxide. Conductive materials of the cathode 104 may include, for example, copper, gold, carbon, nickel, carbon black, graphene, carbon nanotubes, or other conductive materials. Binders of the cathode 104 may include, for example, polyvinylidene fluoride (PVDF), poly(vinylidene fluoride-co-hexafluoropropylene) (PVDF-HFP), styrene-butadiene rubber (SBR), carboxymethyl cellulose (CMC), poly(tetrafluoroethylene) (PTFE), or other material for binding cathode materials together.

Gelling powder of the cathode 104 may include, for example, polyethylene oxide, polypropylene oxide, polyacrylonitrile, poly(methylmethacrylate), cellulose, or any other suitable gelling agent. The materials of the gelling powder of the cathode 104 may be ground or otherwise processed to provide particles fine enough to be mixed with other powdered cathode materials. The gelling powder of the cathode may be configured to cause at least some of the liquid electrolyte (e.g., liquid electrolyte 108) to gel or become gelled electrolyte. For example, liquid electrolyte that contacts any surfaces of the cathode may gel. Such surfaces of the cathode may include pores of the cathode. Accordingly, the gelling powder may cause a portion of liquid electrolyte 108 to gel or form a gelled electrolyte layer on surfaces 116 of the cathode 104 as shown in zoomed portion 110. Thus, a gelled electrolyte layer may form on surfaces 116 of the cathode including pores as they expand or contract and within the cathode 104.

The electrodes 102, 104 may be provided as relatively flat or planar plates or may be wrapped or wound in a spiral or other configuration (e.g., an oval configuration). The electrodes 102, 104 may also be provided in a folded configuration.

The separator 106 may be arranged between the anode 102 and the cathode 104. In other words, the separator 106 may be provided intermediate or between the anode 102 and the cathode 104. The separator 106 may be configured to prevent direct contact between the anode 102 and the cathode 104. The separator 106 may further be configured to allow transport of ionic charge carriers between the anode 102 and the cathode 104.

The separator 106 may take on any suitable size or shape. The separator 106 may be, for example, flat, planar, wrapped or wound in a spiral, elliptical, folded, or any other suitable shape for being arranged between the anode 102 and the cathode 104. In general, the size and shape of the separator 106 may be dependent on or conform to the size and shape of the electrodes 102, 104. For example, the separator 106 may be provided as relatively flat or planar when the electrodes 102, 104 are provided as planar plates. Further, for example, the separator 106 may be provided in a wound configuration to separate the electrodes 102, 104 when such electrodes are provided in a wound or spiral configuration.

The separator 106 may define a membrane forming a microporous layer. The separator 106 may include any suitable material or materials. The separator 106 may include, for example, one or more of a polymer, polyethylene, polypropylene, polyimide, cellulose, or other materials for forming a microporous layer.

The liquid electrolyte 108 may transport positively charged ions between the anode 102 and the cathode 104. The liquid electrolyte 108 may include any suitable material or materials. The liquid electrolyte 108 may include one or more solutes and solvents. Solutes of the liquid electrolyte 108 may include, for example, lithium salts, lithium bis (trifluoromethylsulfonyl) imide (LiTFSI), lithium bis(pentafluoroethylsulfonyl) imide (LiBETI), lithium tris(trifluorosulfonyl) methide, lithium perchlorate ($LiClO_4$), lithium tetrafluoroborate ($LiBF_4$), lithium hexafluoroarsenate ($LiAsF_6$), lithium hexafluorophosphate ($LiPF_6$), or other solute capable of transporting ionic charge carriers. Solvents of the liquid electrolyte 108 may include, for example, one or more of propylene carbonate, ethylene carbonate, dimethyl carbonate, dimethoxyethane, diethoxyethane, or other solvent. The liquid electrolyte 108 may be a low viscosity liquid electrolyte. As used herein, the term "low viscosity" refers to a viscosity of less than 50 centipoises. The viscosity of the liquid electrolyte 108 may less than 10 centipoises. The viscosity of the liquid electrolyte 108 may less than 5 centipoises. In one or more embodiments, a viscosity of the liquid electrolyte 108 is less than 2 centipoises. The electrochemical cell 100 may have an electrolyte weight to cathode weight ratio of 0.5 or less.

The electrochemical cell may further include a housing 118. The housing 118 of the electrochemical cell 100 may include any suitable resilient material or materials. Resilient (e.g., resistant to puncture and corrosion and chemically stable) material or materials may be configured to protect the internal components (e.g., the anode 102, the cathode 104, the separator 106, the liquid electrolyte 108, etc.) of the electrochemical cell 100. Such resilient materials may include, for example, nickel, steel, titanium, aluminum, or other resilient materials. Packaging may include any suitable packaging material or materials for holding internal components of the electrochemical cell 100 together in a predefined shape. Such packaging materials may include, plastic, ceramics, etc.

During charging and discharging of the electrochemical cell 100, lithium ions move between the anode 102 and the cathode 104. For example, when the electrochemical cell 100 is charged, lithium ions flow from the cathode 104 to the anode 102. In contrast, when the electrochemical cell 100 is discharged, lithium ions flow from the anode 102 to the cathode 104.

As the electrochemical cell 100 charges or discharges, the cathode 104 may expand. The cathode 104 may be porous or include pores 114 as shown in zoomed portion 110. Expansion of the cathode 104 may also cause the pores 114 to expand. In typical lithium batteries (or other battery chemistries), liquid electrolyte may not fill pores of a cathode as the cathode and pores expand and, as a result, voids may form in the pores of such cathodes. Voids are breaks in contact between the liquid electrolyte and the cathode that may diminish the effective area for ionic conduction between the liquid electrolyte and the cathode. Thus, such voids may result in erratic changes in voltage of the batteries as the cathode expands and ionic conduction between the liquid electrolyte and the cathode fluctuates. However, the cathode 104 of the electrochemical cell 100 includes gelling powder. The gelling powder of cathode 104 may cause the liquid electrolyte 108 to gel at surfaces 116 of the cathode 104 forming gelled electrolyte layer 112 on the surfaces 116 and in the pores 114 of the cathode 104. Such gelled electrolyte layer 112 may readily fill the pores 114 as they expand, preventing or reducing void formation and maintaining close contact for ionic conduction between the liquid electrolyte 108 and the cathode 104. Accordingly, erratic changes in voltage that may be caused by such voids are also prevented or reduced in electrochemical cell 100.

Figure 2:
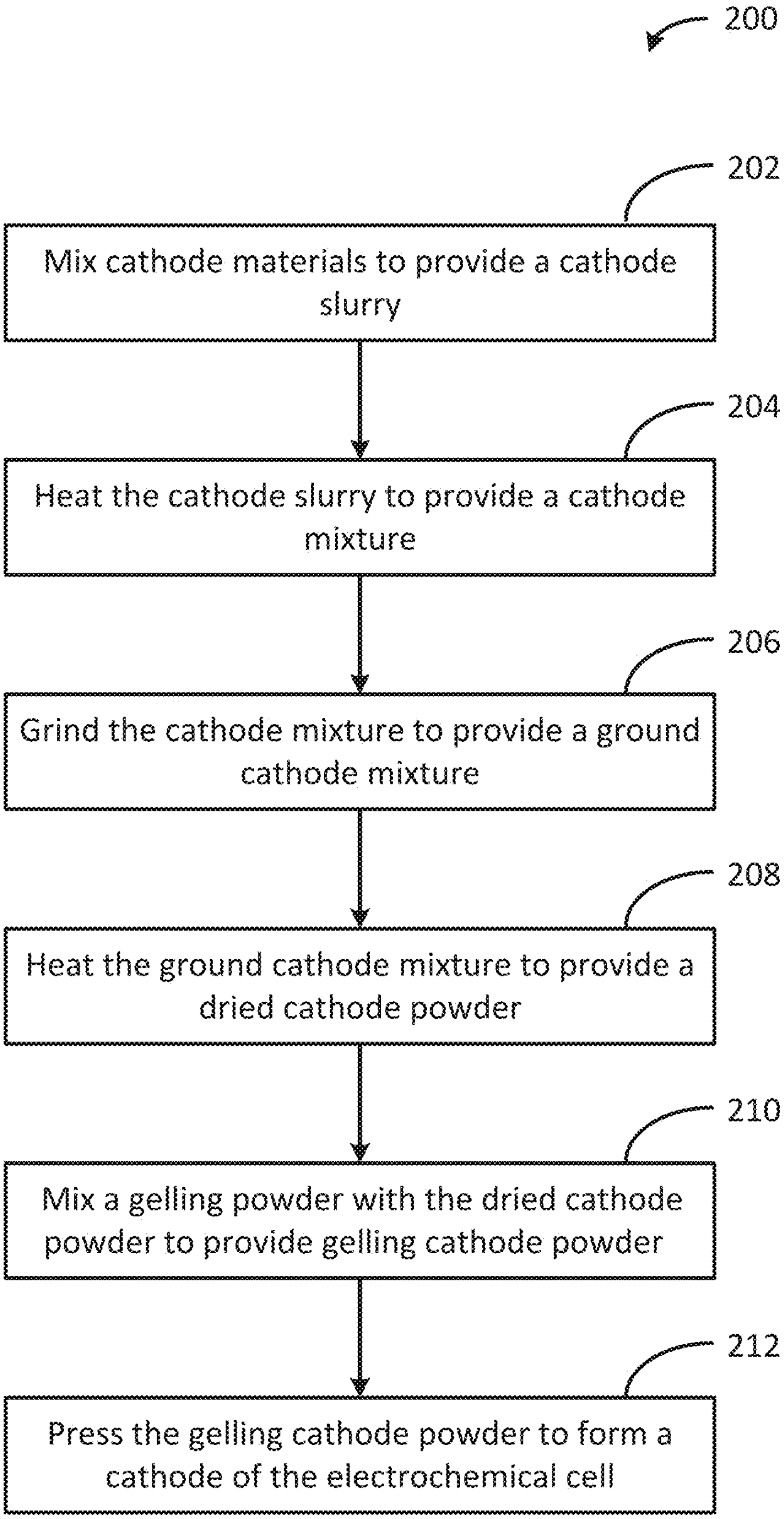
FIG. 2 is schematic flow diagram of a method for forming the electrochemical cell of FIG. 1.

FIG. 2 shows a flow diagram of a method or process 200 for forming a battery or electrochemical cell (e.g., the electrochemical cell 100 of FIG. 1).

At 202, an active material, a conductive material, a binder, and a solvent may be mixed to provide a cathode slurry. The active material, the conductive material, the binder, and the solvent may be mixed using any suitable technique or techniques. Such techniques may include, for example, mixing using a planetary mixer, a rotary mixer, or a spiral mixer. The solvent of the cathode slurry may be at least 25 percent by weight and no greater than 75 percent by weight of the cathode slurry. The solvent may be at least 40 percent by weight and no greater than 60 percent by weight of the cathode slurry. In one or more embodiments, the solvent may be at least 45 percent by weight and no greater than 55 percent by weight of the cathode slurry.

At 204, the cathode slurry may be heated to provide a cathode mixture. The cathode slurry may be heated to at least 100 degrees Celsius to no more than 200 degrees Celsius. Heating the cathode slurry may dry the cathode slurry. In other words, heating the cathode slurry may remove most of or all the solvent from the cathode slurry to form the cathode mixture.

At 206, the cathode mixture may be ground to provide a ground cathode mixture. Grinding the cathode mixture may provide a relatively uniform particle size distribution in the ground cathode mixture. The ground cathode mixture may have a particle size distribution between about 0.1 microns to about 1000 microns. In one embodiment, the ground cathode mixture has an average particle size distribution of at least 100 microns to no greater than 200 microns.

At 208, the ground cathode mixture may be heated to provide a dried cathode powder. The ground cathode mixture may be heated to at least 150 degrees Celsius to no more than 300 degrees Celsius. Heating the ground cathode mixture may dry the ground cathode mixture. In other words, heating the ground cathode mixture may remove any residual solvent and/or moisture from the ground cathode mixture to form the dried cathode powder.

At 210, a gelling powder may be mixed with the dried cathode powder to provide gelling cathode powder. Mixing the gelling powder with the dried cathode powder may provide a more uniform mixing of cathode materials and gelling powder than at other stages of cathode formation. For example, the gelling powder may absorb water or other solvents during previous steps. The uniform distribution of gelling powder in the cathode may ensure that gelling powder is present in pores of the cathode as they expand. Additionally, gelling powder mixed with the dried cathode powder may allow liquid electrolyte to gel in proximity to the cathode after the battery is assembled with liquid electrolyte.

The gelling powder may be mixed with the dried cathode powder using any suitable technique or techniques. Such techniques may include, for example, mixing the gelling powder may be mixed with the dried cathode powder using a planetary mixer, a spiral mixer, or other mixing apparatus or techniques. The gelling cathode powder may include at least 0.1 percent by weight and no greater than 10 percent by weight of the gelling powder. The gelling cathode powder may include at least 1 percent by weight and no greater than 5 percent by weight of the gelling powder. The gelling cathode powder may include at least 2 percent by weight and no greater than 4 percent by weight of the gelling powder.

At 212, the gelling cathode powder may be pressed to form a cathode (e.g., cathode 104) of the electrochemical cell. The gelling cathode powder may be pressed into a current collector cup, onto a current collector, or into a mold to form the cathode. The gelling cathode powder may be subject to a pressure of about 1000 psi to about 100000 psi when pressed.

The method 200 may further include disposing a liquid electrolyte (e.g., liquid electrolyte 108) in a housing (e.g., housing 118) of the electrochemical cell to transport positively charged ions between an anode (e.g., anode 102) and the cathode of the electrochemical cell. Additionally, the method 200 may further include sealing the electrochemical cell. The gelling powder may be configured to cause the liquid electrolyte to form a gelled electrolyte layer (e.g., gelled electrolyte layer 112) on surfaces of the cathode.

EXPERIMENTAL DATA

To demonstrate the advantage of the invention described herein, 25 D-shaped hermetic electrochemical cells were built. The experiment included three control groups. The electrochemical cells of the control groups had an electrolyte weight vs cathode weight ratio of 0.48 for control group 1, 0.54 for control group 2, and 0.59 for control group 3. The experiment also included two test groups. The electrochemical cells of test group 1 included 2 percent by weight of gelling powder added to dried cathode powder (e.g., mixing at 210 of FIG. 2) during cathode formation. The electrochemical cells of test group 2 included 3 percent by weight of gelling powder added to dried cathode powder (e.g., mixing at 210 of FIG. 2) during cathode formation. The gelling powder used included polyethylene oxide (PEO) and had molecule weight of 5,000,000 kDa and was purchased from Sigma-Aldrich. Each of the control groups and test groups had 5 cells except for test group 3, which had 4 cells. Except for adding gelling powder to the two test groups and controlling electrolyte loading for each of the three control groups, all other cell building processes were the same for the 24 electrochemical cells included in the experiment. Additionally, each of the 24 electrochemical cells underwent the same burn-in process and were then discharged at a C-rate of C/1200 (e.g., discharged over 1200 hours) to below 1.0 volt.

The results showed that adding 2-3 percent by weight can mitigate erratic voltage at higher depth-of-discharge. The C/1200 discharge voltage curves of the control group cells are plotted in FIG. 3. Additionally, the C/1200 discharge voltage curves of control group 2 and test group 1 are plotted in FIG. 4. In consideration for practical application, the discharge voltage curves of FIGS. 3 and 4 are cutoff at 2.2 volts.

Figure 3:
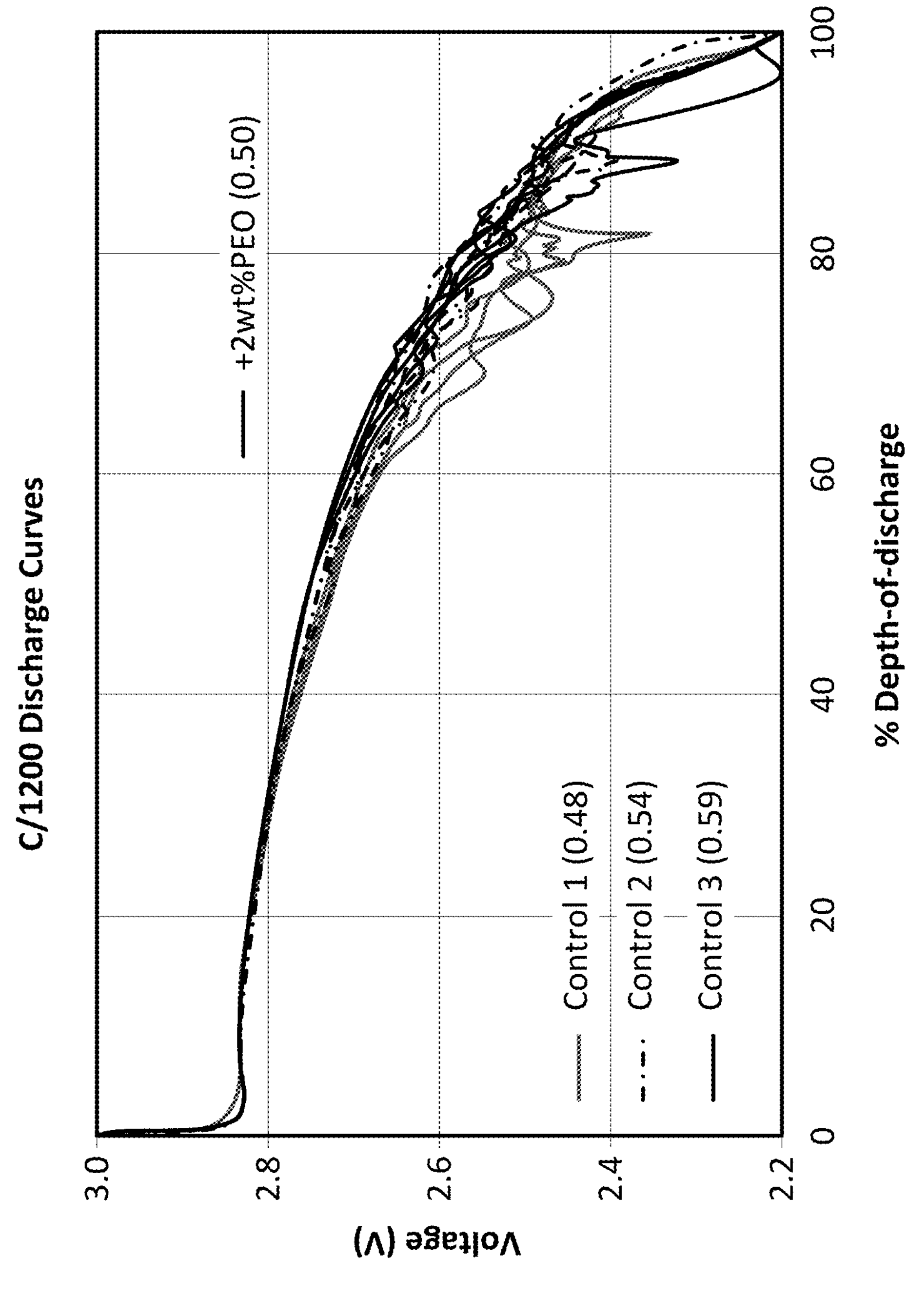
FIG. 3 is a graph of discharge curves of lithium batteries that do not include gelling powder in the cathode.

FIG. 3 shows the discharge voltage curves of 15 cells from the three control groups. As shown, all cells show erratic voltages beyond 60 percent depth-of-discharge. An increase in the electrolyte weight vs cathode weight ratio from 0.48 to 0.59 can decrease the severity of erratic voltages but cannot fully mitigate the erratic voltages even at a ratio of 0.59. Higher electrolyte/cathode weight ratios may not be favorable because such elevated ratios may result in electrochemical cells with lower energy densities. In other words, an electrochemical cell with a higher electrolyte weight vs cathode weight ratio will have lower useable capacity than an electrochemical cell with a lower electrolyte/cathode weight ratio when both cells are the same size.

Figure 4:
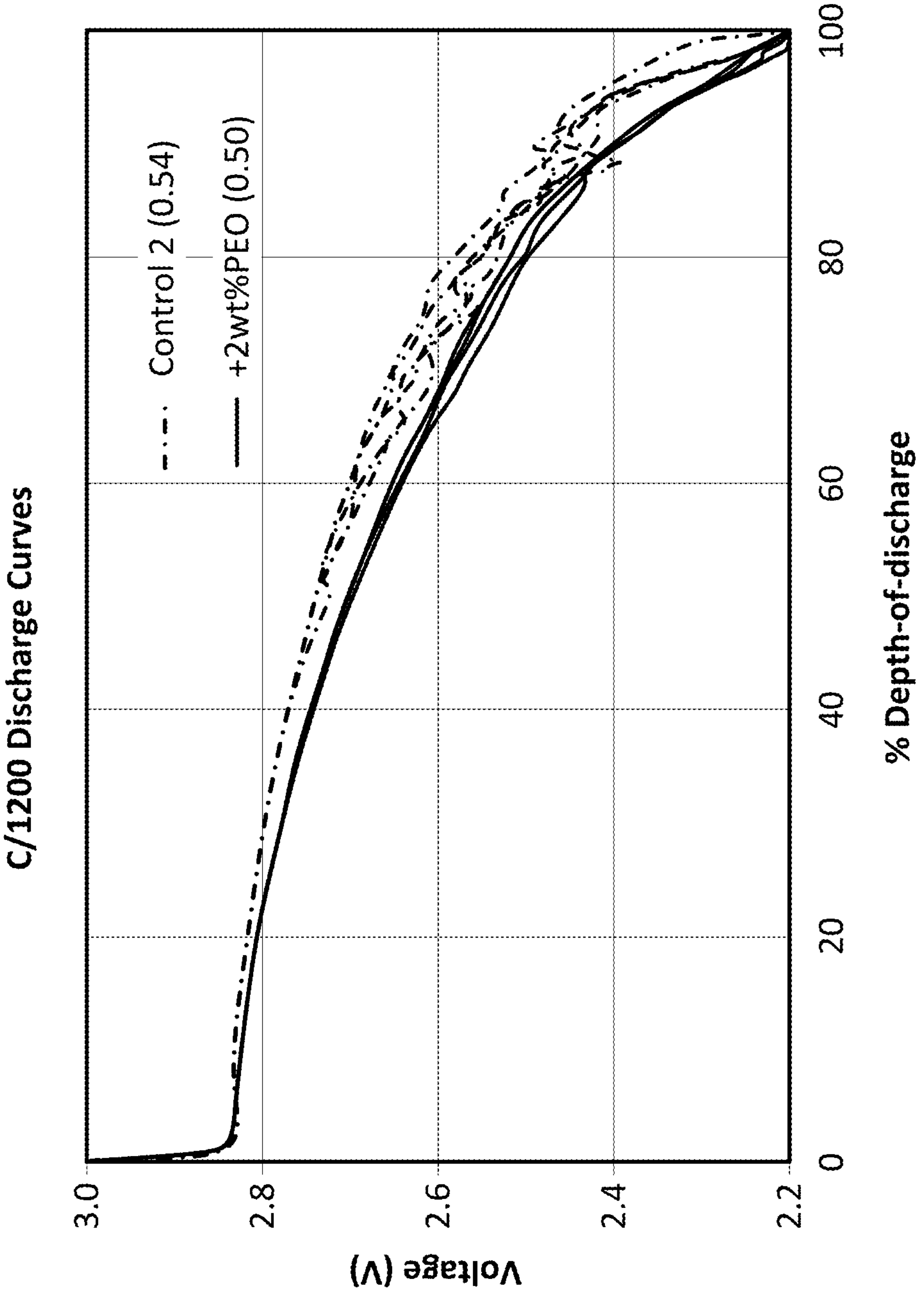
FIG. 4 is a graph of voltage curves comparing a control group of batteries that do not include gelling powder to a test group of batteries that do include gelling powder.
Figure 5:
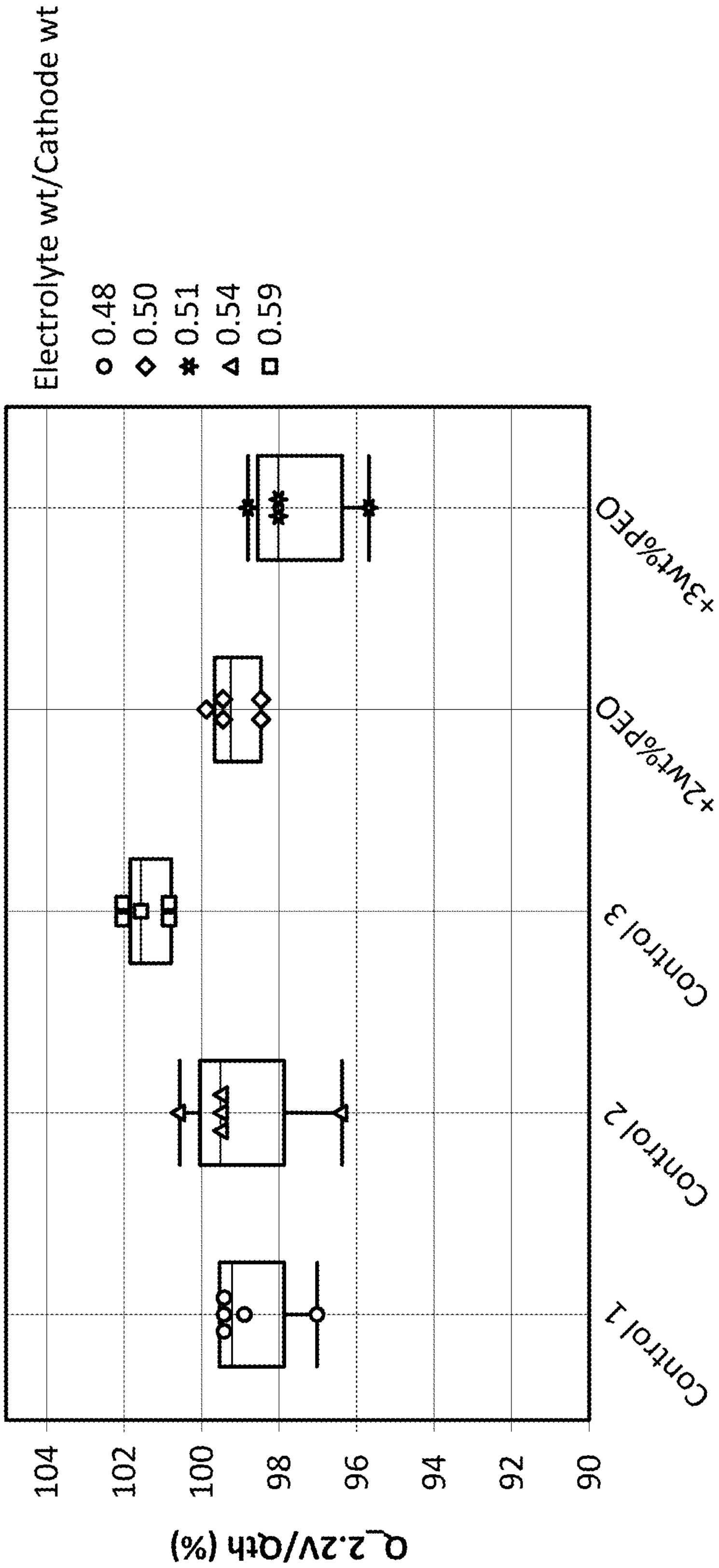
FIG. 5 is a graph depicting a ratio of cell deliverable capacity vs. theoretical capacity calculated based on cathode active material weight.

FIG. 4 shows discharge curves of the 5 cells from control group 2 and the 5 cells from test group 1. As shown, the discharge voltage curves are smooth and lack any significant erratic voltages down to 2.2 volts. Such an improvement appears more significant when it is acknowledged that the electrochemical cells of test group 1 have a relatively lower electrolyte weight vs cathode weight ratio than the electrochemical cells of control group 2 (i.e., an electrolyte weight vs cathode weight ratio of 0.50 vs. 0.54).

FIG. 4 shows the ratio of cell deliverable capacity vs. expected practical capacity calculated from cathode active material weight of the 24 electrochemical cells used in the experiment. As shown, the electrochemical cells from both test groups can deliver similar capacity to those of control groups 1 and 2 and are close to 100 percent of expected practical capacity. The control 3 group shows slightly higher deliverable capacity vs. expected practical capacity with a cutoff voltage set at 2.2 volts at C/1200 but at the cost of having a much higher electrolyte weight vs cathode weight ratio and a reduced energy density.

As shown by the results of the experiment, the addition a few percent (e.g., 2 to 3 percent) of gelling powder to the cathode material can stabilize the discharge voltage curves without significant impact on deliverable capacity.

The invention is defined in the claims. However, below there is provided a non-exhaustive list of non-limiting examples. Any one or more of the features of these examples may be combined with any one or more features of another example, embodiment, or aspect described herein.

Example Ex1: A method of forming an electrochemical cell, the method comprising: mixing an active material, a conductive material, a binder, and a solvent to provide a cathode slurry; heating the cathode slurry to provide a cathode mixture; grinding the cathode mixture to provide a ground cathode mixture; heating the ground cathode mixture to provide a dried cathode powder; mixing a gelling powder with the dried cathode powder to provide gelling cathode powder; and pressing the gelling cathode powder to form a cathode of the electrochemical cell.

Example Ex2: The method of example Ex1, wherein the gelling cathode powder comprises 2.5 percent by weight to 4 percent by weight of gelling powder.

Example Ex3: The method of example Ex1, wherein the gelling powder comprises polyethylene oxide.

Example Ex4: The method of example Ex1, wherein the conductive material comprises conductive carbon.

Example Ex5: The method of example Ex1, forming an anode of the electrochemical cell, the anode comprising lithium.

Example Ex6: The method of example Ex1, further comprising disposing a liquid electrolyte in a housing of the electrochemical cell to transport positively charged ions between an anode and the cathode of the electrochemical cell.

Example Ex7: The method of example Ex6, further comprising sealing the electrochemical cell and forming a gelled electrolyte layer on surfaces of the cathode and within pores of the cathode.

Example Ex8: The method of example Ex6, wherein the liquid electrolyte comprises a lithium salt solution.

Example Ex9: The method of example Ex6, wherein the liquid electrolyte comprises a viscosity less than 10 centipoise.

Example Ex10: The method of example Ex1, wherein the active material of the cathode comprises carbon fluoride and silver vanadium oxide.

Example Ex11: An electrochemical cell comprising: an anode; a cathode comprising: an active material; a conductive material; a binder; and a gelling powder; a separator arranged between the anode and the cathode, the separator configured to prevent direct contact between the anode and the cathode; and a liquid electrolyte to transport positively charged ions between the cathode and the anode.

Example Ex12: The electrochemical cell of example Ex11, wherein the cathode comprising 2% to 3% by weight gelling powder.

Example Ex13: The electrochemical cell of example Ex11, wherein the gelling powder comprises polyethylene oxide.

Example Ex14: The electrochemical cell of example Ex11, further comprising a gelled electrolyte layer on surfaces of the cathode and within pores of the cathode.

Example Ex15: The electrochemical cell of example Ex11, wherein the conductive material comprises conductive carbon.

Example Ex16: The electrochemical cell of example Ex11, wherein the anode comprises lithium.

Example Ex17: The electrochemical cell of example Ex11, wherein the electrolyte comprises a lithium salt solution.

Example Ex18: The electrochemical cell of example Ex11, wherein the liquid electrolyte comprises a viscosity of less than 10 centipoise.

Example Ex19: The electrochemical cell of example Ex11, wherein the electrochemical cell comprises an electrolyte weight to cathode weight ratio of 0.5 or less.

Example Ex20: The electrochemical cell of example Ex11, wherein the active material of the cathode comprises carbon fluoride and silver vanadium oxide.

All scientific and technical terms used herein have meanings commonly used in the art unless otherwise specified. The definitions provided herein are to facilitate understanding of certain terms used frequently herein and are not meant to limit the scope of the present disclosure.

As used herein, singular forms "a," "an" and "the" include plural referents unless the context clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the inventive technology.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A method of forming an electrochemical cell, the method comprising:

mixing an active material, a conductive material, a binder, and a solvent to provide a cathode slurry;

heating the cathode slurry to provide a cathode mixture;

grinding the cathode mixture to provide a ground cathode mixture;

heating the ground cathode mixture to provide a dried cathode powder;

mixing a gelling powder with the dried cathode powder to provide gelling cathode powder; and pressing the gelling cathode powder to form a cathode of the electrochemical cell.

2. The method of claim 1, wherein the gelling cathode powder comprises 2.5 percent by weight to 4 percent by weight of gelling powder.

3. The method of claim 1, wherein the gelling powder comprises polyethylene oxide.

4. The method of claim 1, wherein the conductive material comprises conductive carbon.

5. The method of claim 1, forming an anode of the electrochemical cell, the anode comprising lithium.

6. The method of claim 1, further comprising disposing a liquid electrolyte in a housing of the electrochemical cell to transport positively charged ions between an anode and the cathode of the electrochemical cell.

7. The method of claim 6, further comprising sealing the electrochemical cell and forming a gelled electrolyte layer on surfaces of the cathode and within pores of the cathode.

8. The method of claim 6, wherein the liquid electrolyte comprises a lithium salt solution.

9. The method of claim 6, wherein the liquid electrolyte comprises a viscosity less than 10 centipoise.

10. The method of claim 1, wherein the active material of the cathode comprises carbon fluoride and silver vanadium oxide.

* * * * *